United States Patent

Fukuoka et al.

[11] Patent Number: 6,006,430
[45] Date of Patent: Dec. 28, 1999

[54] ALUMINUM HEAT EXCHANGER

[75] Inventors: Mikio Fukuoka, Bisai; Yoshifumi Aki, Kariya; Ryuji Morishita, Takata-gun, all of Japan

[73] Assignee: Nippondenso Co., Ltd., Kariya, Japan

[21] Appl. No.: 08/940,027

[22] Filed: Sep. 29, 1997

Related U.S. Application Data

[63] Continuation of application No. 08/436,272, filed as application No. PCT/JP94/01534, Sep. 16, 1994, abandoned.

[30] Foreign Application Priority Data

Sep. 16, 1993 [JP] Japan ................... 5-230346

[51] Int. Cl.$^6$ .................. B23P 15/00; F28F 7/00
[52] U.S. Cl. .................. 29/890.03; 165/81; 165/149
[58] Field of Search .................. 165/149, 81, 82, 165/133; 29/890.03

[56] References Cited

U.S. PATENT DOCUMENTS

| | | | |
|---|---|---|---|
| 3,165,151 | 1/1965 | Astrup et al. | 165/149 X |
| 3,228,461 | 1/1966 | Seekins | 165/81 |
| 3,894,580 | 7/1975 | Chartet | 165/149 X |
| 3,939,908 | 2/1976 | Chartet | 165/149 |
| 4,534,407 | 8/1985 | Lardner | 165/149 X |
| 4,619,313 | 10/1986 | Rhodes et al. | 165/149 X |
| 5,176,205 | 1/1993 | Anthony | 165/133 |

FOREIGN PATENT DOCUMENTS

| | | | |
|---|---|---|---|
| 2251794 | 5/1974 | France . | |
| 4106296 | 9/1992 | Germany . | |
| 144996 | 10/1981 | Japan . | |
| 23566 | 2/1983 | Japan . | |
| 45478 | 9/1987 | Japan . | |
| 5287 | 1/1988 | Japan . | |
| 13799 | 1/1991 | Japan . | |
| 46774 | 4/1991 | Japan . | |
| 46775 | 4/1991 | Japan . | |
| 270895 | 9/1992 | Japan | 165/149 |
| 1484510 | 9/1977 | United Kingdom | 165/149 |

*Primary Examiner*—Leonard Leo
*Attorney, Agent, or Firm*—Pillsbury Madison & Sutro LLP

[57] ABSTRACT

An aluminum heat exchanger includes laminated aluminum tubes and corrugated fins, a core portion receiving respective ends of tubes into sheet metals members, and iron or stainless steel inserts having high strength receiving U-shaped folded pieces of the sheet metal members contacting the corrugated fins at the outermost portion of the core portion. The tubes and the corrugated fins are held and pressed from both sides of the core portion by the inserts and the corrugated fins are protected from coming apart during a brazing operation.

15 Claims, 12 Drawing Sheets

ALUMINUM HEAT EXCHANGER

This is a continuation of application Ser. No. 08/436,272, filed on May 16, 1995, which was abandoned upon the filing hereof, which is a 371 of PCT/JP94/01534, filed Sep. 16, 1994.

BACKGROUND OF THE INVENTION

1. Field of the Invention

The present invention relates to an aluminum heat exchanger and its manufacturing method where reinforcing plates of the heat exchanger are assembled on both sides in a lamination direction of a core portion having alternating layers of a tube in which liquid flows and a fin improving heat exchange efficiency, and to a jig function when it is brazed.

2. Description of Related Art

Figure 11:
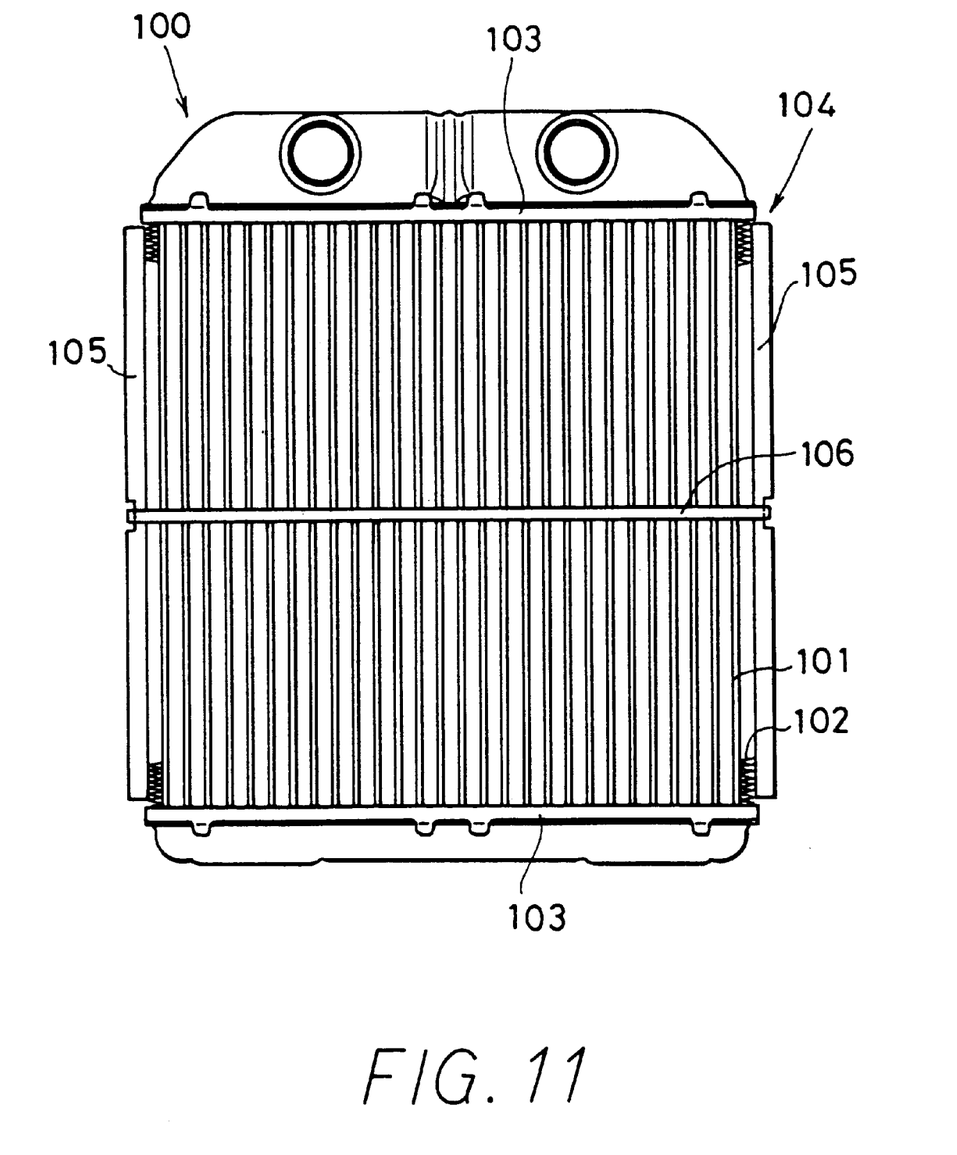
FIG. 11 is a front view illustrating a core portion of an aluminum heat exchanger in the prior art.
Figure 12:
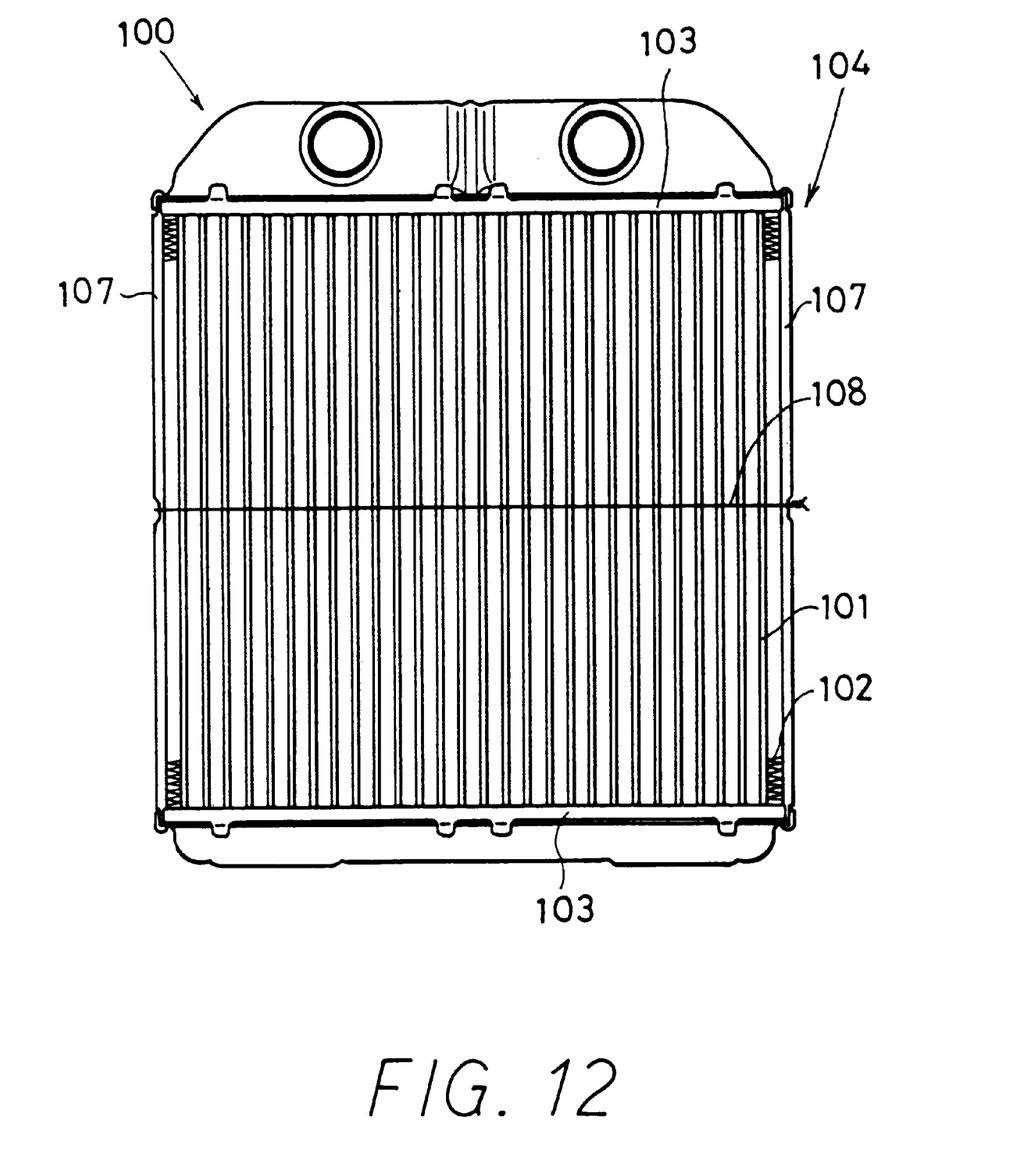
FIG. 12 is a front view illustrating an aluminum heat exchanger in the prior art.

When a lamination type heat exchanger having a core portion having alternating layers of a tube and a fin disposed therein is manufactured, an expansion of the core portion by elasticity of the tube and the fin at a temporary assembly before a brazing operation or falling of the fin by declining of elastic holding force of the tube and the fin during the brazing operation under high temperature exist undesirably. Therefore, as shown in FIG. 11, core portion 104 of heat exchanger 100 is fastened and held by jig 105 and band 106 so that the shape of core portion 104 can be maintained until the brazing operation is over. Also as shown in FIG. 12, core portion 104 is fastened and held by winding wire 108 around inserts 107 being fixed at the outside of the outermost fins 102 of core portion 104 so that core portion 104 can retain its shape until the brazing operation is over. In FIGS. 11 and 12, tubes 101 allow liquid to flow therein and sheet metals 103 support both end portions of tubes 101.

Thus, in the manufacturing method of the heat exchanger mentioned above, supporting tools such as jig 105, band 106, and wire 108, etc. are required to maintain the shape of core portion 104 until a brazing operation is over so that operation efficiency becomes bad and the number of working processes increases. Consequently, productivity of core portions declines. Also, since it costs to have jig 105, band 106 and wire 108 which are scrapped after the end of the brazing operation, the cost of the product becomes high.

Thus, in order to eliminate fixing jigs such as jig 105, band 106, and wire 108, a technique where side plates of a core portion having a jig function are pressed and held by a core plate is disclosed in Japanese Examined Patent Publication No. 62-45478. The technique is effective for soldering a core portion of a copper heat exchanger. The fusing point of copper is much higher than that of solder so that copper can maintain a jig function at around the temperature at which solder melts. However, when a core portion of an aluminum heat exchanger is brazed, both fusing points of an aluminum core material and an aluminum blazing filter metal are roughly the same so that the aluminum core material softens around a temperature at which the filter metal melts and looses its jig function. Thus, it is improper to apply the technique mentioned above to an aluminum heat exchanger.

In view of the above problems, it is an object of the present invention to provide a heat exchanger of which a core portion thereof has self-holding function without using special tools during a brazing operation of the core portion in a manufacturing process of an aluminum heat exchanger, and which realizes improved productivity and reduction of product cost of an aluminum heat exchanger.

DISCLOSURE OF INVENTION

The above objects are achieved according to a first aspect of the present invention by providing a heat exchanger including: a core portion having alternately disposed therein a tube having heat exchange liquid flowing therein and a fin disposed between adjacent tubes to improve heat exchange efficiency; a first tank having a sheet metal member having insert holes receiving one end portion of the tubes; a second tank having a sheet metal member having insert holes receiving the other end portion of the tubes; and inserts assembled at opposite sides of the core in a lamination direction of the core portion and fastening the core portion, wherein the core portion, the first tank and the second tank are made of aluminum type metallic material being lightweight and having low strength, the inserts are made of metallic material having a higher fusing point and higher strength than the aluminum type metallic material, and the inserts are fixed to be covered from the outside by the first tank and second tank.

The operation and the effect of this aspect of the present invention will now be explained.

In a temporary assembly process before a brazing operation, in a heat exchanger of the present invention, a metallic material having higher strength than aluminum is used for inserts. Therefore, even if the core portion tries to expand in a lamination direction by elasticity of corrugated fins and tubes of the core portion, the core portion does not expand because it is pressed firmly by two inserts, and deviation in dimensions of the core portion is not created.

During a brazing operation, the aluminum heat exchanger is placed in a heating furnace and is heated to around 600° C. and brazing metal is fused thereto so that the aluminum heat exchanger is brazed. The core portion is held firmly to be pressed from both sides by inserts having a higher fusing point and strength than aluminum. Also, since the inserts do not soften at around a fusing point of an aluminum type metal and still have enough strength, a sufficient jig function can be provided even under high temperature during a brazing operation.

Since the insert is fixed to be held from the outside by a first tank and a second tank, that is, a member forming the tank is temporarily fixed to the insert to cover it from the outside, the brazing metal melts. Also, since the insert becomes free from tank material holding the insert at brazing operation when an aluminum tank material is softening, a difference of thermal expansion coefficients between aluminum and a high fusing point and high strength material (iron or stainless steel in the embodiment) under high temperature can be absorbed.

Thus, the aluminum heat exchanger in the present invention can improve the strength of the core portion by holding the core portion with two inserts made of a high strength material. Since a jig function is maintained even under high temperature during a brazing operation, special tools like a band and a wire are unnecessary so that the number of assembly processes and the cost can be reduced.

BEST MODE FOR CARRYING OUT THE INVENTION

Hereinafter embodiments adopting a heater core for heating of an automotive air-conditioner according to the present invention will be explained with reference to the accompanying drawings.

Figure 1:
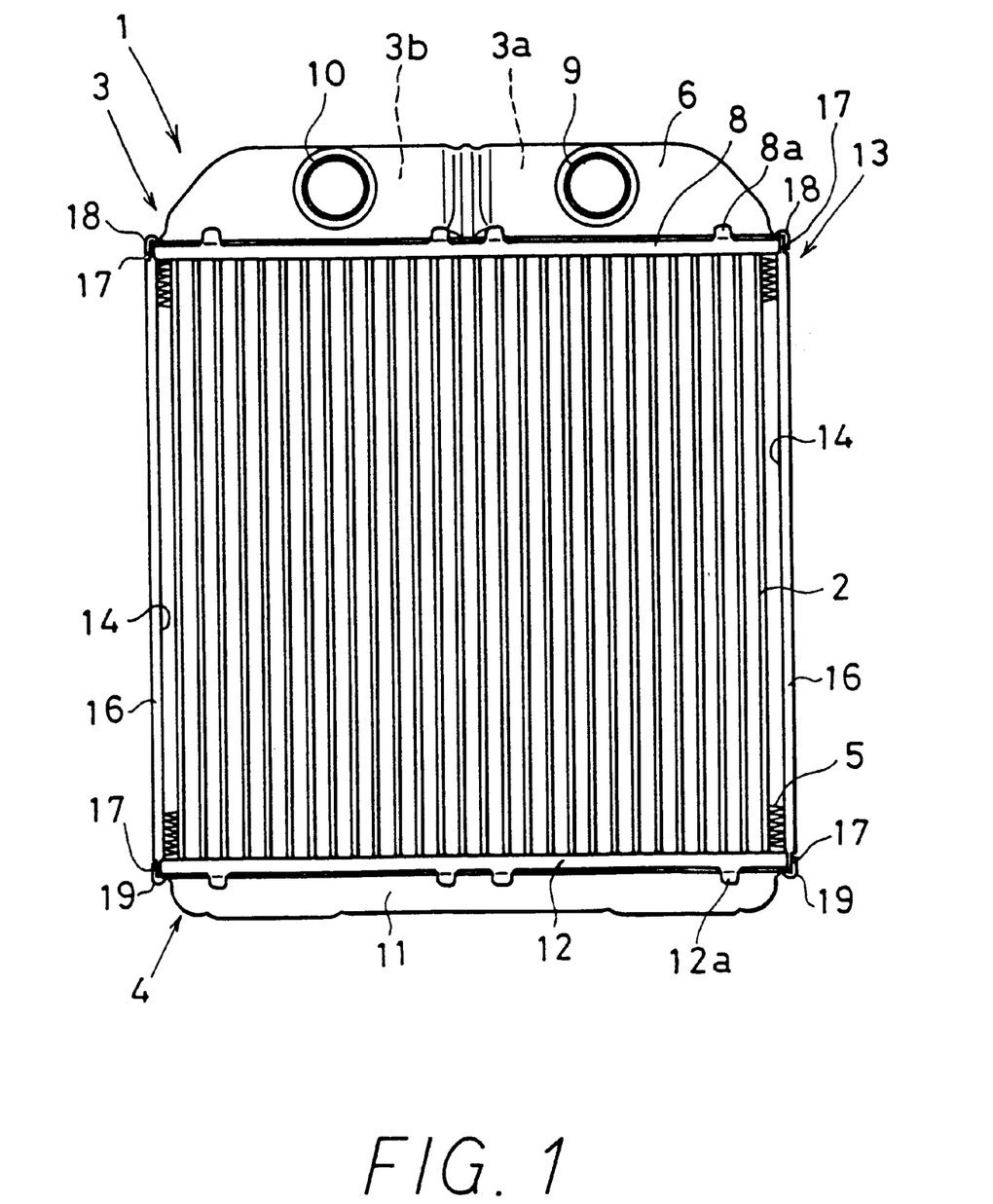
FIG. 1 is a front view illustrating an aluminum heat exchanger of a first embodiment of the present invention.
Figure 2:
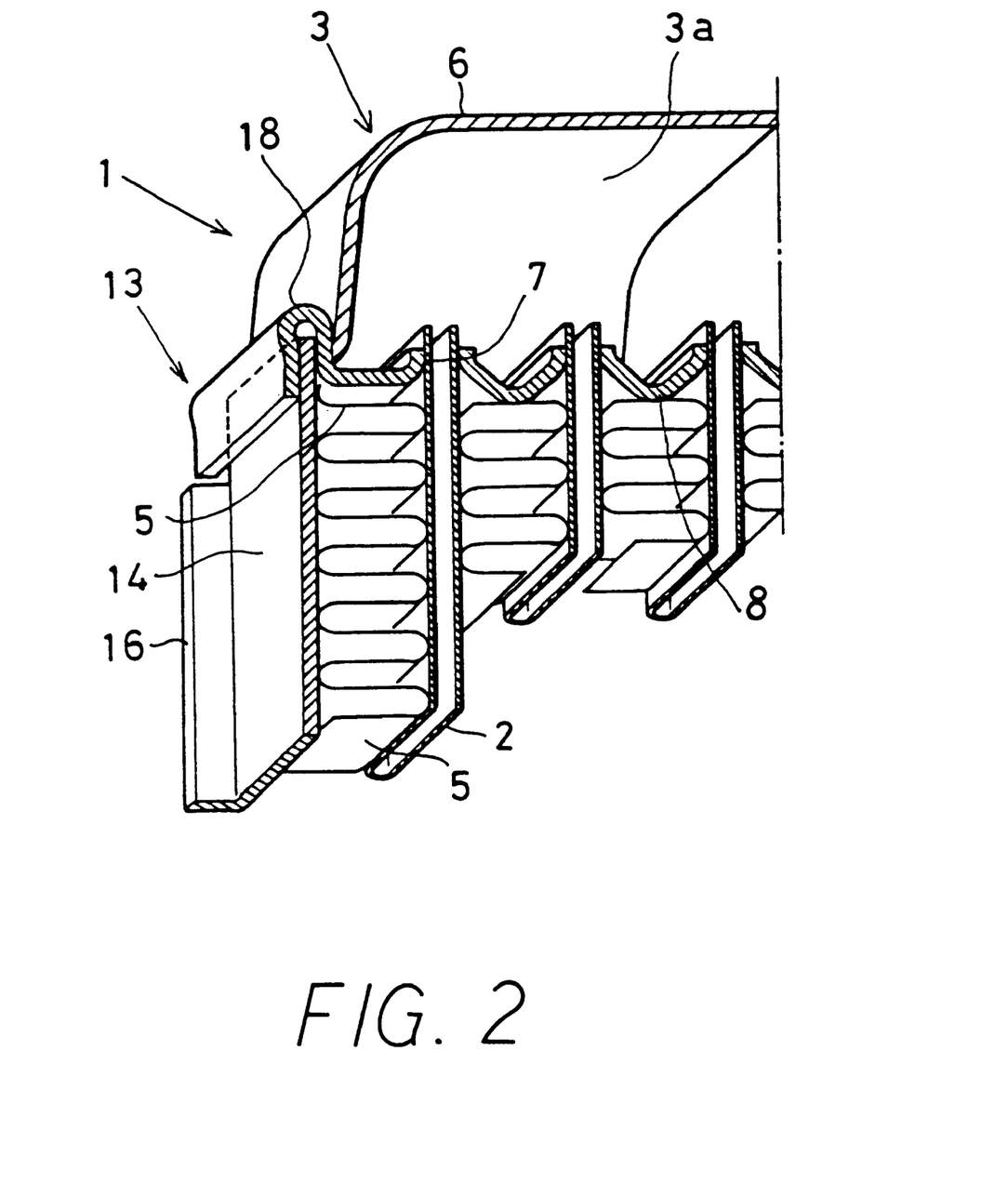
FIG. 2 is a perspective view illustrating a main portion of an aluminum heat exchanger of the first embodiment.

FIG. 1 through FIG. 6 are illustrating a first embodiment. FIG. 1 is a view illustrating an aluminum heat exchanger of the present invention. FIG. 2 is a view illustrating a main portion of the aluminum heat exchanger.

Aluminum heat exchanger 1 of the first embodiment is used as a heater core for an automotive hot water type heating system having a heat source of engine cooling water. Aluminum heat exchanger 1 includes a plurality of tubes 2 which have engine cooling water flowing therein, upper tank 3 connected thereto at top ends of tubes 2 and lower tank 4 connected thereto at lower ends of tubes 2.

Tubes 2 heat blown air by heat-exchanging engine cooling water flowing therein and blown air being blown to an interior of a vehicle. Tube 2 is a clad material having a brazing metal on a surface of a core material and is formed into a flattened tubular shape. The core material of tube 2 is made of aluminum material which is a first metallic material having the thickness of about 0.3 mm to 0.35 mm, for example, 3000 series aluminum composition metal having a fusing point of about 650° C. Brazing metal is aluminum system metal having lower fusing point than the core material, for example, 4000 series aluminum composition metal having a fusing point of about 600° C.

Corrugated fin 5 is connected by brazing between adjacent tubes 2 in order to improve heat exchange efficiency. Corrugated fin 5 is made of the same aluminum material as tube 2 and is made into a corrugated shape.

Upper tank 3 is connected by brazing at an opening side of top capsule 6 being box-shaped with a base and includes sheet metal member 8 forming receive holes 7 to insert top ends of tubes 2. Top capsule 6 and sheet metal member 8 are made of a clad material having a brazing metal at the surface of a core material of the same aluminum material as tubes 2.

The inside of upper tank 3 is divided by partition walls (not shown in the figure) into inflow chamber 3a which has engine cooling water entering from an engine water jacket therein and outflow chamber 3b which has engine cooling water returning to the engine water jacket therefrom. Inflow pipe 9 is connected at a side wall to inflow chamber 3a of upper tank 3 by brazing. A cooling water pipe leading engine cooling water coming from engine water jacket to aluminum heat exchanger 1 is connected to inflow pipe 9.

Inflow pipe 9 and outflow pipe 10 are connected to opposite surfaces of upper tank 3 opposing the air flowing direction between tubes 2. Moreover, top capsule 6 and sheet metal 8 are temporarily assembled by temporary crimping with claw portion 8a formed at sheet metal 8 before a brazing operation of aluminum heat exchanger 1.

Lower tank 4 is connected with box-shaped bottom capsule 11 with a base at an opening side of bottom capsule 11 and includes sheet metal member 12 forming insert holes in order to receive bottom end portions of tubes 2. Bottom capsule 11 and sheet metal member 12 are made of a clad material having a brazing metal at a surface of a core material of the same aluminum material as tubes 2. Moreover, bottom capsule 11 and sheet metal member 12 are temporarily assembled by temporary crimping with claw portion 12a formed at sheet metal member 12 before a brazing operation of aluminum heat exchanger 1.

Figure 3:
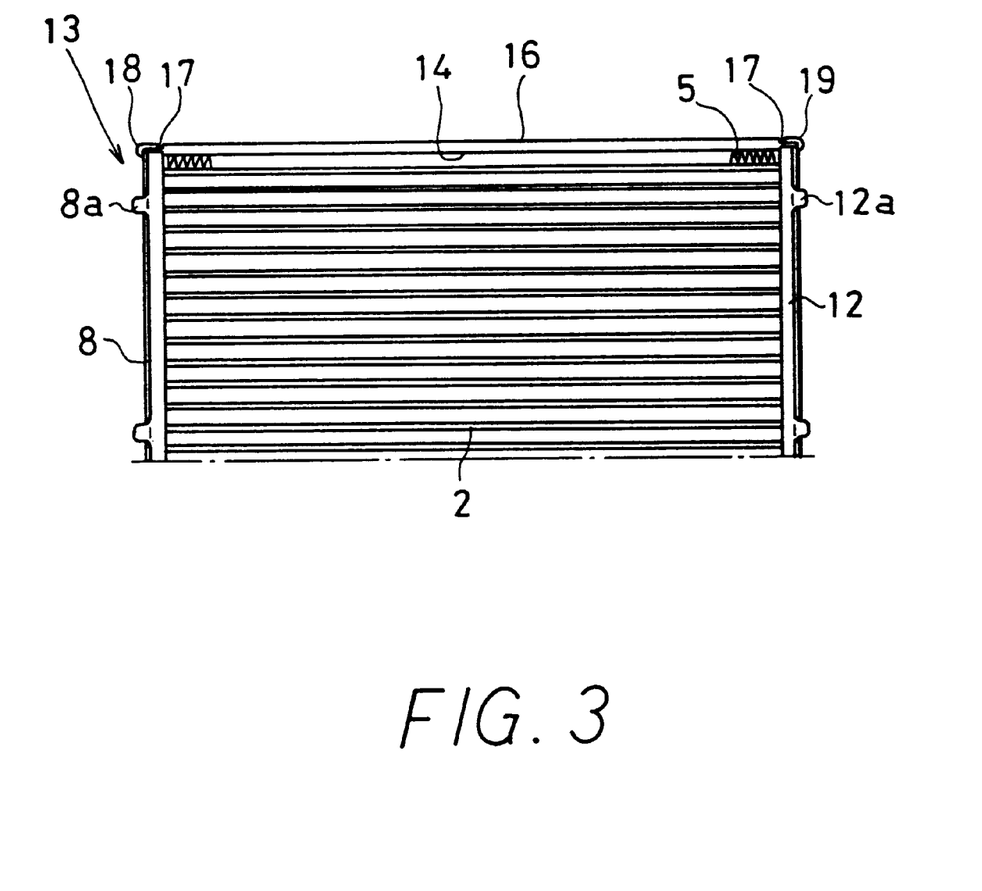
FIG. 3 is a front view illustrating a core portion of the aluminum heat exchanger of the first embodiment.

In the first embodiment as shown in FIG. 3, core portion 13 of aluminum heat exchanger 1 is formed by laminating tubes 2 and corrugated fins 5 and assembling sheet metal members 8 and 12 at top and a bottom end portions. Each of two inserts 14 made of the second metallic material having a higher fusing point and higher strength than an aluminum material used for tube 2 and corrugated fin 5 is assembled and fixed at a respective outer most side in a lamination direction of tubes 2 of core portion 13.

Figure 4:
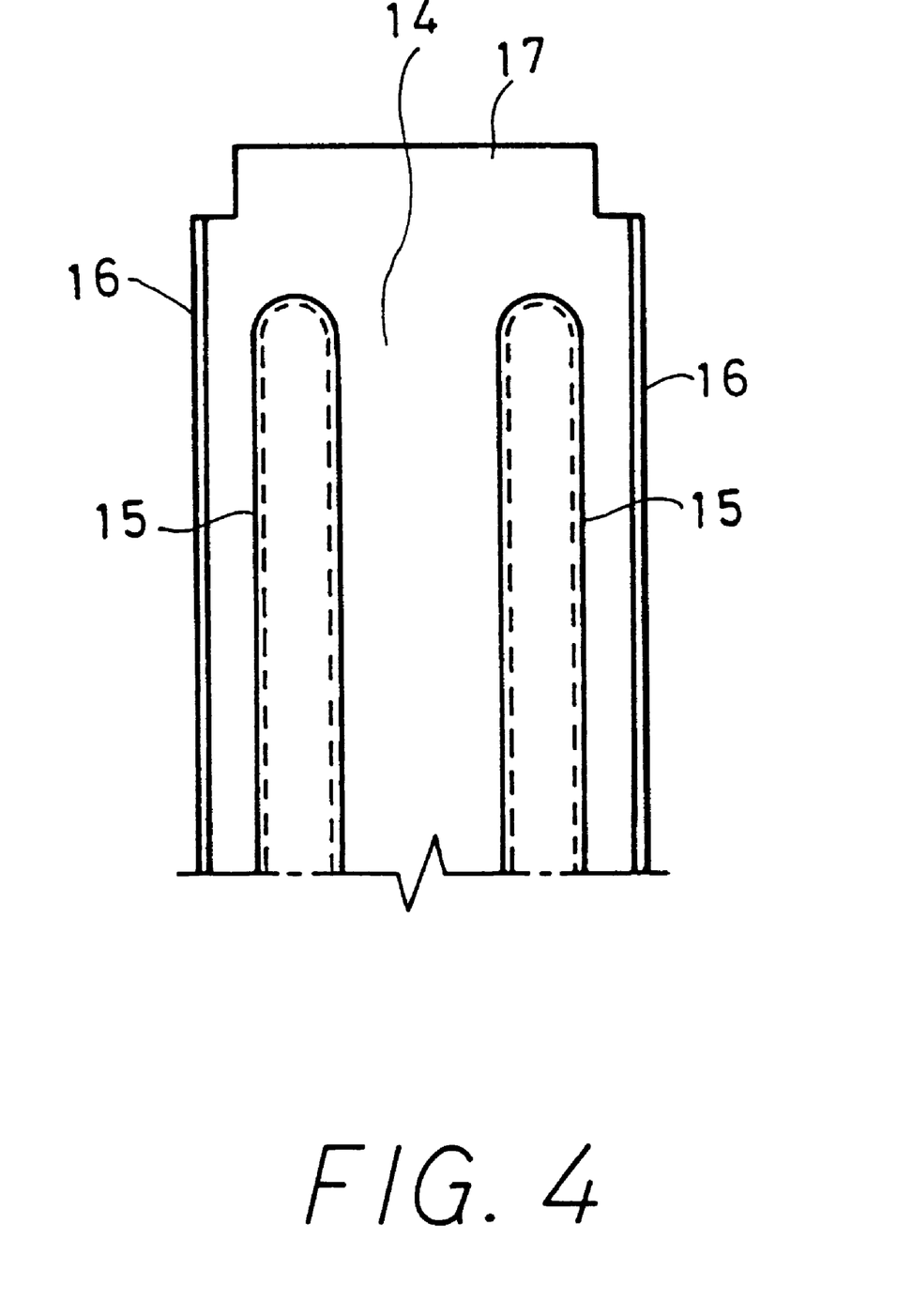
FIG. 4 is a plan view illustrating an insert of the first embodiment.

Two inserts 14 are the reinforcing plates of the present invention and are made of a metallic material like iron or stainless steel having a plate length of about 100 mm to 260 mm, plate width of about 16 mm to 36 mm and plate thickness of about 0.6 mm. As shown in FIG. 4, two ribs 15 and two flanges 16 are provided for reinforcing in a longitudinal direction on inserts 14. Ribs 15 are formed in order to bulge toward the outside in a lamination direction of tubes 2 and flange 16 is bent to the outside.

Two insert pieces 17 are formed at each of the sides in a longitudinal direction of the two inserts 14. During temporary assembly of core portion 13, that is, before a brazing operation of aluminum heat exchanger 1, insert pieces 17 are inserted to be held from the outside by U-shaped folded pieces 18 and 19 formed at sheet metal members 8 and 12 while contacting the outermost corrugated fin 5. Also, inserts 14 press tubes 2 and corrugated fins 5.

Next, a brazing operation of aluminum heat exchanger 1 in the first embodiment will be explained according to FIG. 1 through FIG. 4. Top end portions of tubes 2 are inserted into insert holes 7 formed in sheet metal member 9 of upper tank 3. Also, bottom end portions of tubes 2 are inserted into insert holes 7 formed in sheet metal member 12 of lower tank 4. Corrugated fins 5 are inserted between adjacent tubes 2 and both end portions of two inserts 14 with both sides contacting the outermost corrugated fins 5 are inserted to be held from the outside by U-shaped folded pieces 18 and 19 formed at sheet metal members 8 and 12 respectively. Moreover, top capsule 6 is temporarily assembled to sheet metal member 8 by temporary crimping claw portion 8a. Bottom capsule 11 is temporarily assembled to sheet metal 12 by temporal crimping claw portion 12a.

Thus, as shown in FIG. 1, aluminum heat exchanger 1 is temporally assembled as mentioned above. At this time, even if core portion 13 tries to expand toward the outside lamination direction of core portion 13 by elasticity of tubes 2 and corrugated fins 5, core portion 13 does not expand since two inserts 14 are made of a high strength material like iron or stainless steel. Other than that, the more core portion 13 expands in the outside lamination direction, the more core portion 13 contacts to be pressed by inserts 14 so that dimensions of core portion 13 do not deviate after a brazing operation is over since inserts 14 holds core portion 13 firmly.

Next, flux is spread on a surface of aluminum heat exchanger 1 by spraying powdered flux or by spreading flux dissolved in water so that a brazing metal is spread uniformly. After that, aluminum heat exchanger 1 is put in a heating furnace and heated up until around 600° C. to melt the metal and a brazing operation is performed. At that time, since a fusing point of core materials of tube 2 and corrugated fin 5 is about 650° C. which is close to the fusing point of a brazing metal, the aluminum core material with cladded metal also softens quite a bit. Therefore, conventionally, if the same aluminum material is used for inserts 14 as other parts, since the jig function of inserts 14 and the holding function by elasticity of tubes 2 and corrugated fins 5 are lost, corrugated fins 5 fall down and the contact state between tubes 2 and corrugated fins 5 becomes weak during a brazing operation without jig 105, band 106 or wire 108. However, in the present invention, core portion 13 is held firmly to be pressed by inserts 14 made of iron or stainless steel with high fusing points and high strength. Inserts 14 still have enough strength without softening around a fusing point of aluminum type brazing metals and they are made of iron or stainless steel. Therefore, such deficiency does not occur.

Although core portion 13 is held from both sides by iron or stainless steel inserts 14, the thermal expansion of aluminum, iron and stainless steel is different under high temperature at a brazing operation. The following scheme is necessary in order to absorb the differences of thermal expansion coefficients.

Figure 5:
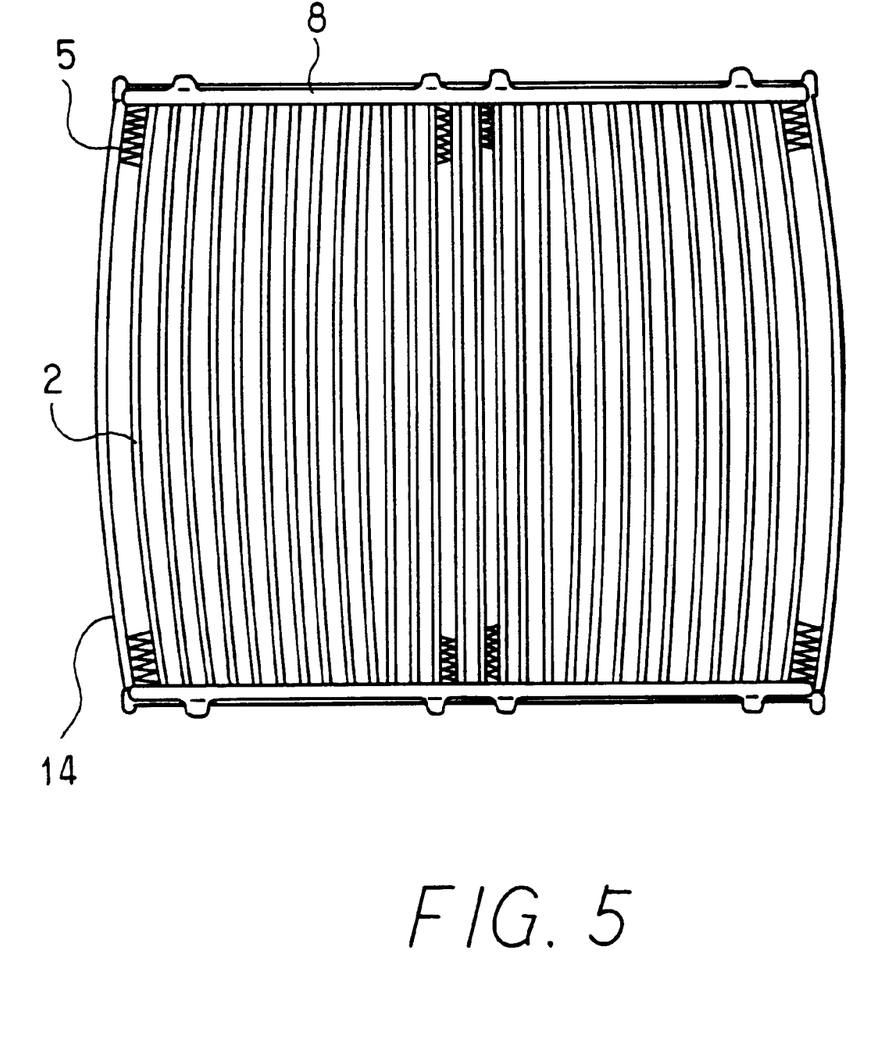
FIG. 5 is a view illustrating a core portion before a brazing operation.
Figure 6:
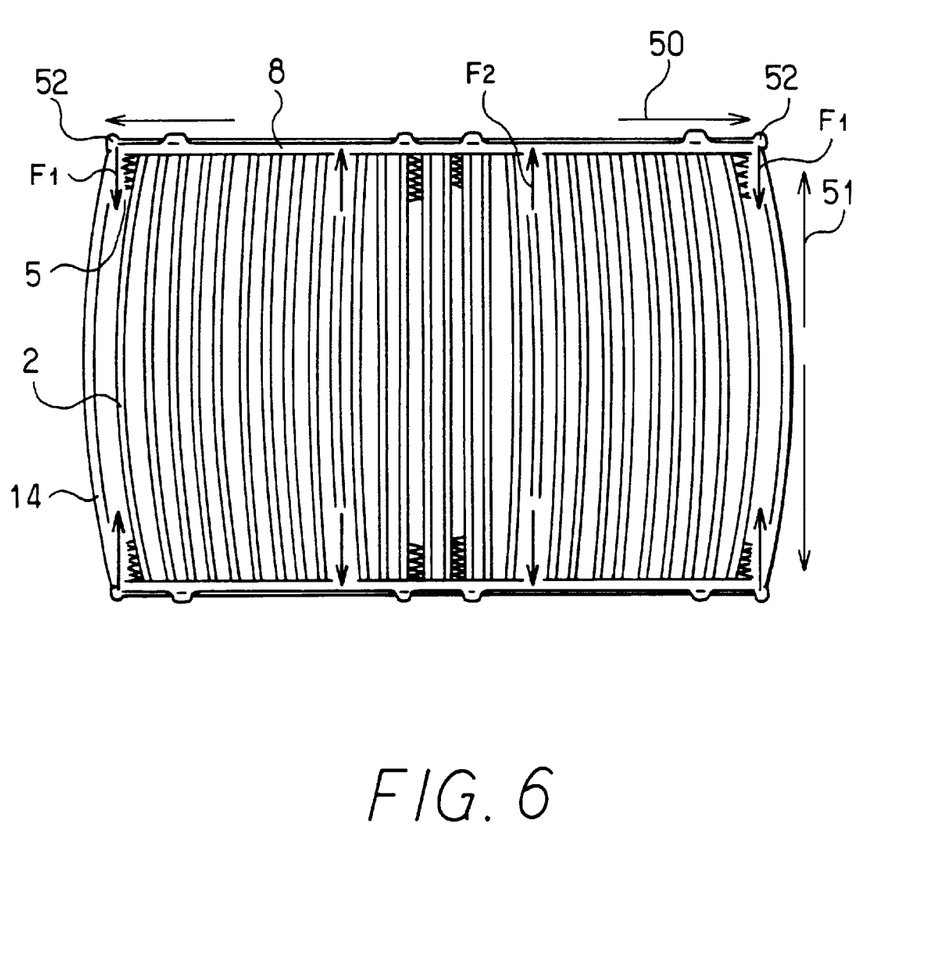
FIG. 6 is a view illustrating the core portion during the brazing operation.

Before a brazing operation as shown in FIG. 5, core portion 13 expands in a lamination direction by elasticity of tubes 2 and corrugated fins 5. If core portion 13 is exposed to high temperature in a heating furnace during a brazing operation, core portion 13 formed by tubes 2, corrugated fins 5 and sheet metal member 8 expands by thermal expansion of aluminum not only in a lamination direction 50 but also in direction 51 parallel to tubes 2. At that time, iron or stainless steel inserts 14 having a smaller thermal expansion coefficient than aluminum do not follow the expansion of core portion 13, especially the expansion in direction 51 parallel to tubes 2. Therefore, at temporary assembly before a brazing operation, if sheet metal member 8 and inserts 14 are fixed firmly, force F1 acts on connection portion 52 of sheet metal member 8 and inserts 14 in the direction to prevent expansion of core portion 13 and force F2 resulting from thermal expansion of core portion 13 acts on the other portion of sheet metal member 8. Thus, sheet metal member 8 becomes buckled. Therefore, inserts 14 are best temporarily fixed to sheet metal member 8 with small force.

As shown in FIG. 2, in the present invention, inserts 14 are inserted to be covered from the outside by folded pieces 18 and 19 formed on sheet metals metal member 8 and 12 respectively, that is, sheet metal member 8 is temporaly fixed so as to cover inserts 14 from the outside. Therefore, at a brazing operation with a brazing metal melting and aluminum sheet metal 8 which is quite soft, joint portion 52 (shown in FIG. 6) of sheet metal member 8 and inserts 14 actually become free. Thus, since force F1 in the direction to prevent thermal expansion does not act on sheet metal member 8, sheet metal member 8 is not buckled. On the other hand, as regards an extension in lamination direction 50 by thermal expansion of core portion 13, since sheet metal member 8 is made of aluminum just like tube 2 and corrugated fin 5 comprising core portion 13, core portion 13 and sheet metal member 8 extend with the same degree of thermal expansion so that the deficiency mentioned above does not occur.

In the present invention, material used for inserts 14 is iron or stainless steel not aluminum used conventionally. The thickness of inserts 14 is about 60% of conventional aluminum inserts. Since iron and stainless steel are higher in strength than aluminum, the thickness is enough to have a jig function at a brazing operation. As shown in FIG. 5, before the brazing operation, core portion 13 tries to expand in lamination direction 50 by elasticity of tubes 2 or corrugated fins 5. If thickness of inserts 14 of a high strength material is the same as the conventional one, a force preventing expansion of core portion 13 acts excessively and tubes 2 and corrugated fins 5 forming core portion 13 become buckled.

The brazing operation is finished by taking out aluminum heat exchanger 1 from a heating furnace and cooling it down at room temperature.

The operation of aluminum heat exchanger 1 is similar to that of a conventional heater core of an automotive air-conditioner so that engine cooling water being warmed in an engine water jacket flows into inflow chamber 3a fixed in top capsule 6 of upper tank 3 from inflow pipe 9. The engine cooling water flowing into inflow chamber 3a flows in tubes 2a for an approach route, goes toward lower tank 4 and flows into bottom capsule 11 of lower tank 4. The engine cooling water flowing into bottom capsule 11 flows into outflow chamber 3b by way of tube 2b for a return route connected to inflow chamber 3b. The engine cooling water flowing into inflow chamber 3b from tube 2b goes to the engine water jacket by way of outflow pipe 10 fixed at top capsule 6. At this time, the engine cooling water flowing in tubes 2a and 2b heats up air by exchanging heat with the air flowing in a blow duct. Thus, an interior of a vehicle becomes warm.

As mentioned above, when aluminum heat exchanger 1 is heated up in a heating furnace to be brazed, core portion 13 is held by two inserts 14 so that core portion 13 can be brazed without using holding tools such as a jig, a band or a wire for core portion 13. That is, since core portion 13 maintains temporarily assembled state without using holding tools, corrugated fin 5 does not fall from adjoining tubes 2 and a defective joint between tube 2 and corrugated fin 5 does not occur. Also, deviation of dimensions of a finished product of aluminum heat exchanger 1 is not created.

Since a brazing operation can be simplified without holding tools to reinforce core portion 13, efficiency of a brazing operation can be improved and productivity of aluminum heat exchanger 1 can be also improved. The product cost can be reduced since the cost for holding tools becomes unnecessary.

Figure 7:
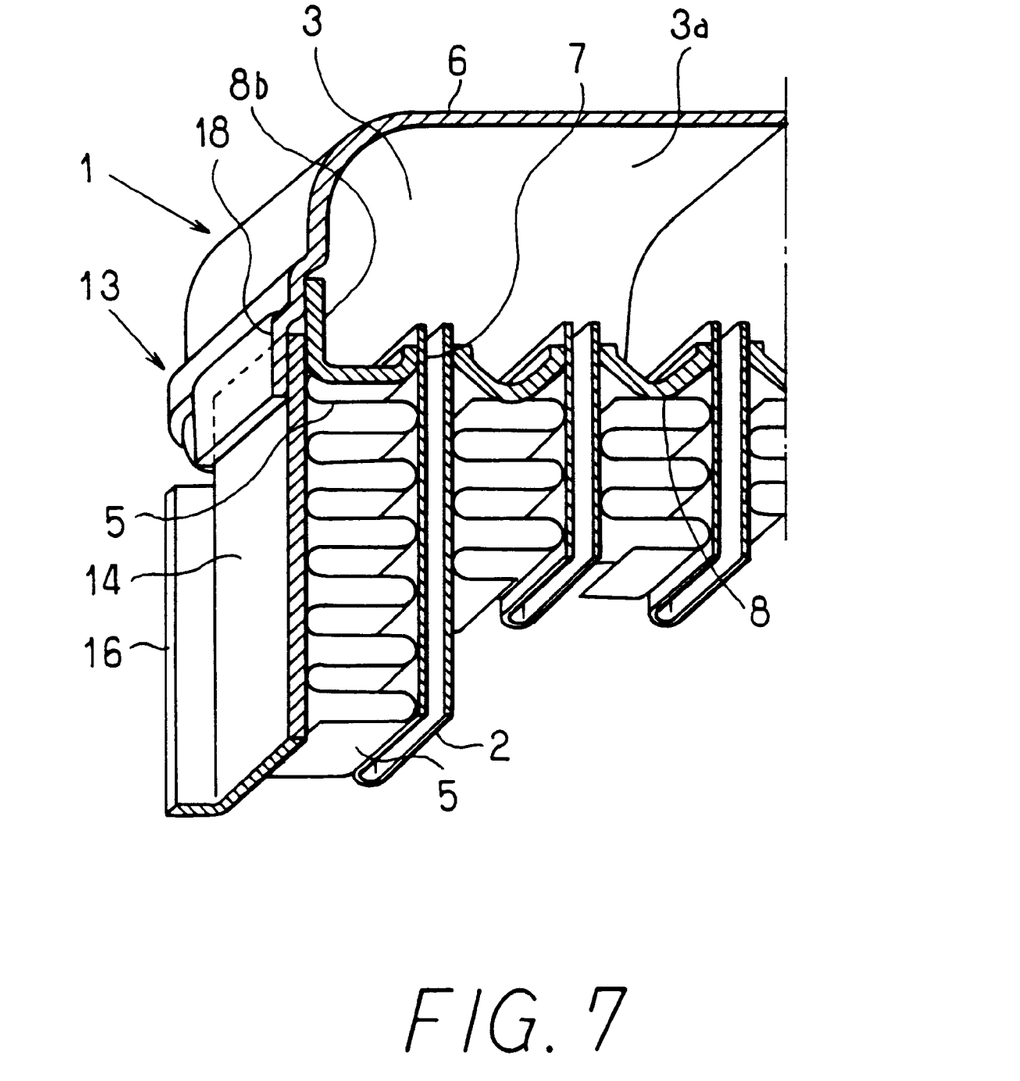
FIG. 7 is a view illustrating a main portion of an aluminum heat exchanger of a second embodiment.

FIG. 7 illustrates the second embodiment of the present invention.

In the first embodiment as mentioned above, as shown in FIG. 2, although inserts 14 are inserted to be held from the outside by U-shaped folded pieces 18 and 19 formed on sheet metal member 8 and 12 respectively, in the fourth embodiment, step portion 18 is fixed at a joint portion of insert 8 of top capsule 6 forming upper tank 3. Insert 14 is inserted between step portion 18 and stand portion 8b of sheet metal member 8. The side of lower tank 4 also has the same construction.

With the construction similar to the first embodiment, step portion 18 of top capsule 6 is assembled to be covered from outside by insert 14. Thus, at the brazing operation when a brazing metal melts and sheet metal member 8 softens, since insert 14 becomes free from step portion 18 and stand portion 8b of sheet metal member 8, difference of thermal expansion coefficient between aluminum and iron or stainless steel can be absorbed.

Figure 8:
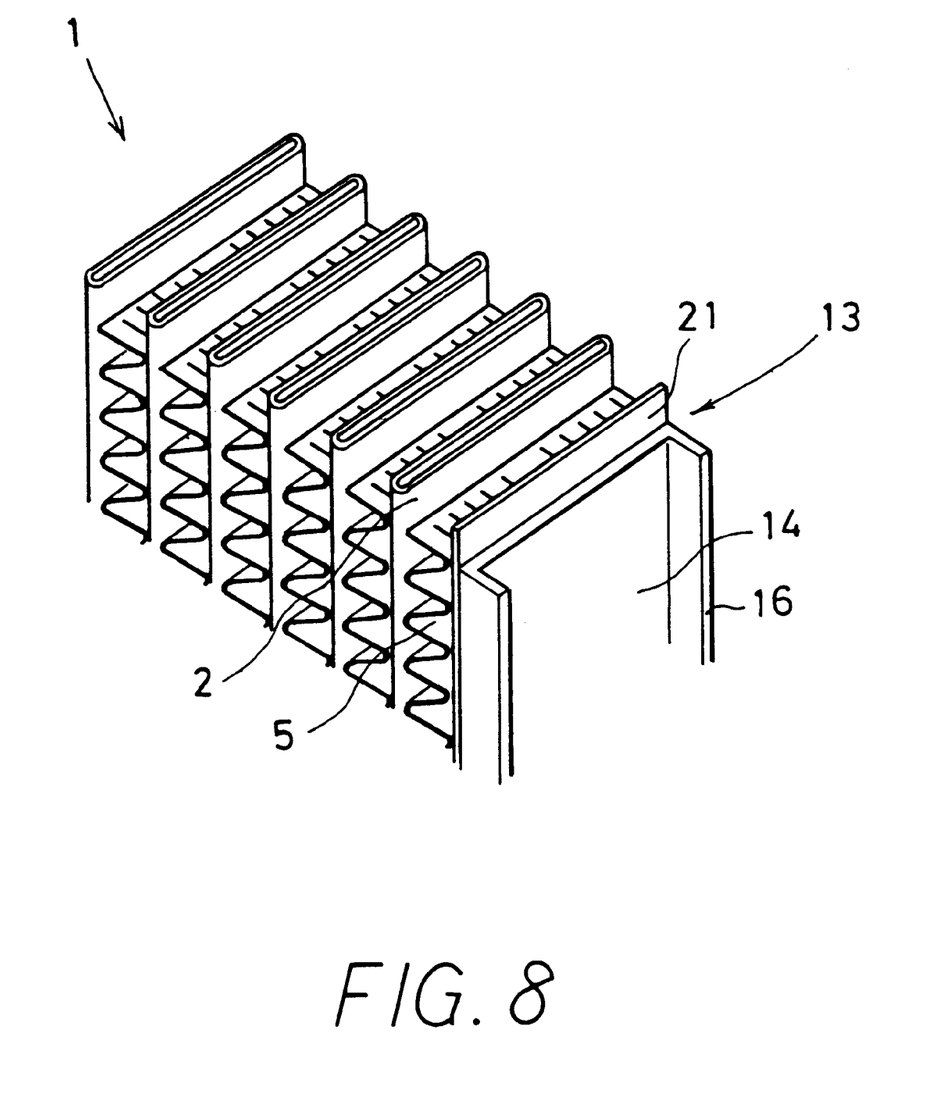
FIG. 8 is a view illustrating a main portion of an aluminum heat exchanger of a third embodiment.

FIG. 8 illustrates the third embodiment of the present invention and the main portion of aluminum heat exchanger 1.

In the third embodiment, at temporary assembly of aluminum heat exchanger 1, aluminum brazing foil 21 is fastened between insert 14 and corrugated fin 5 at the outermost portion of core portion 13 and they are connected by putting them in a heating furnace. Therefore, since core portion 13 can be perfectly unified with insert 14, reinforcing effect of core portion 13 superior to that of the first embodiment is obtained. That is, pressure tightness of tube 2 and rigidity of corrugated fin 5 can be improved.

Figure 9:
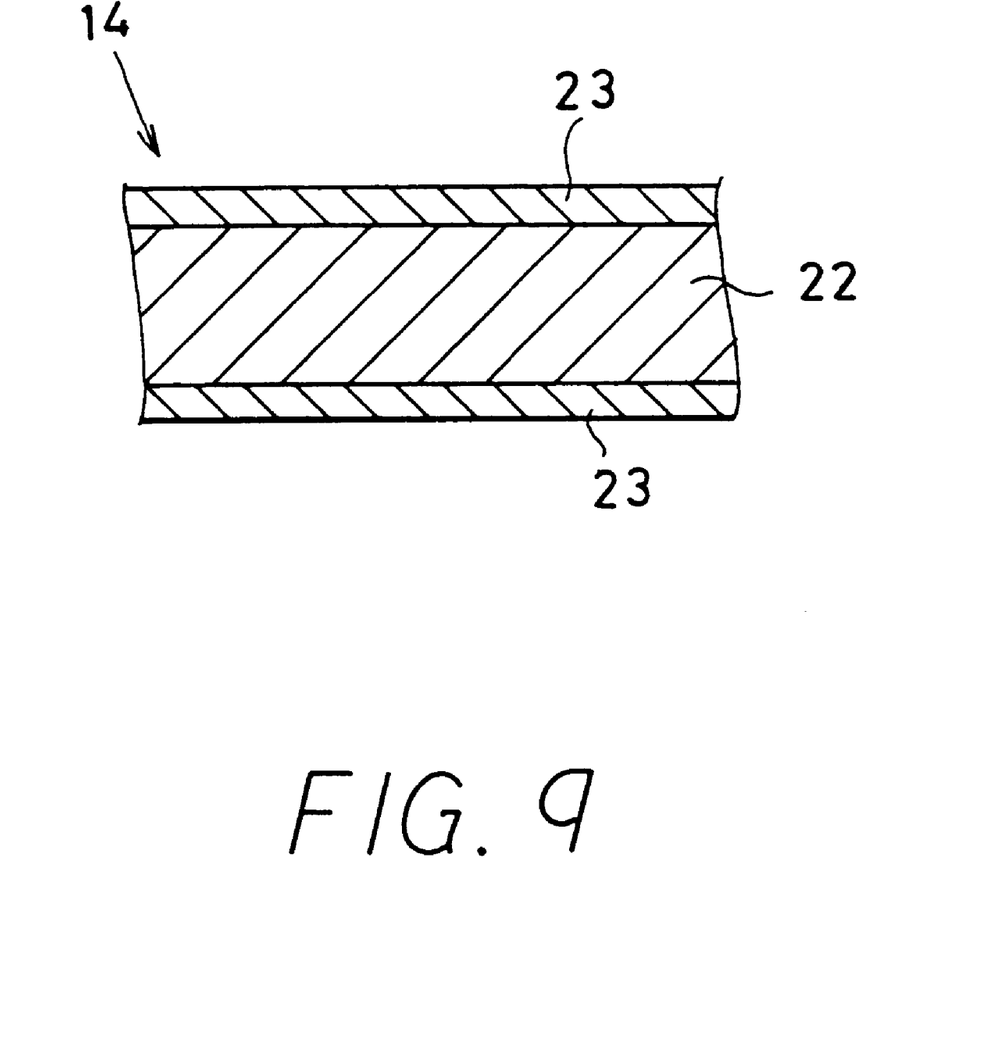
FIG. 9 is a view illustrating a main portion of an insert of a fourth embodiment.

FIG. 9 illustrates the fourth embodiment and a main portion of aluminum heat exchanger 1.

Insert 14 of the third embodiment is made of metallic plate aluminum-silicon type plated 23 plating on the surface of metallic core 22. Thus, since insert 14 is protected from rusting, durability can be improved. Since aluminum-silicon type plating has almost the same components as a brazing filter metal and the fusing point is also similar to that of a brazing metal, aluminum-silicon type plating can be used as a metal. Like the second embodiment, corrugated fin 5 at the outermost portion of core portion 13 and insert 14 can be connected by brazing. However, according to the inventors of the present invention, about 35 μm in thickness of plating is not enough for brazing so that about 70 μm in thickness is necessary. In the third embodiment, iron insert 14 is coated with aluminum-silicon type plating. Although an aluminum type brazing metal can be spread on iron insert 14, extensibility of iron and aluminum is different so that much difficulty is involved in the present situation.

Figure 10:
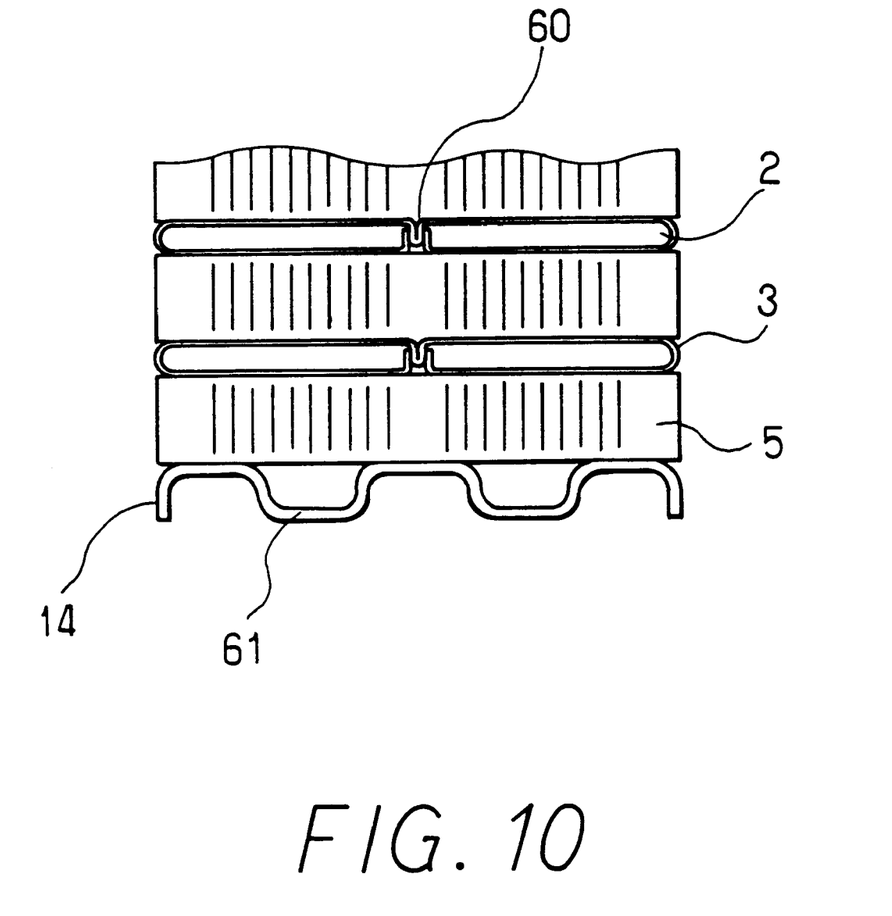
FIG. 10 is a view illustrating a main portion of an aluminum heat exchanger of a fifth embodiment.

The fifth embodiment of the present invention will be explained with reference to FIG. 10.

In the third and fourth embodiments mentioned above, in order to keep pressure tightness of tube 2 by improving rigidity of corrugated fin 5 of aluminum heat exchanger 1 using an iron or stainless steel insert 14, the amount of aluminum-silicon type plating of insert 14 is increased and brazing foil is added to braze insert 14 and corrugated fin 5. However, in the fifth embodiment, pressure tightness of tube 2 is improved by using tube 2 having a bent shape 60 and rigidity of insert 14 can be improved by forming rib 61 at insert 14. Therefore, pressure tightness of tube 2 can be kept without brazing an iron or stainless steel insert 14 and corrugated fin 5.

In each embodiment mentioned above, although this invention is applied to aluminum heat exchanger 1, the invention can be also applied to a heat exchanger with a resin top capsule. In this case, only a core portion is put in a heating furnace during a brazing operation.

In the embodiment mentioned above, although this invention is applied to a heater core as an automotive hot water heater, the invention can be applied to an automotive radiator, an automotive oil cooler, a condenser or an evaporator of an air-conditioner for vehicles, houses or factories. Also, the invention maybe applied to a tube portion operating heat exchange at a pair of formed plates and a lamination type heat exchanger forming a tank portion lining up at one end or both ends of the tube portion. Insert 14 as a reinforcing plate can have a bracket for installing the heat exchanger on a casing or non-assembly members of a vehicle.

Industrial Applicability

An aluminum heat exchanger in the present invention can be used, for example, as an automotive heater core of hot water heater having engine cooling water as a heat source.

What is claimed is:

1. A heat exchanger comprising:
a core portion comprising tubes adapted to have heat exchange liquid flowing therein and fins disposed between adjacent tubes to improve heat exchange efficiency;
a first tank having a sheet metal member defining insert holes receiving one end portion of said tubes, said sheet metal member having a U-shaped portion at each end, said U-shaped portion opening towards said core portion in an axial direction of said tubes;
a second tank having a sheet metal member defining insert holes receiving another end portion of said tubes, said sheet metal member having a U-shaped portion at each end, said U-shaped portion opening towards said core portion in an axial direction of said tubes; and
a pair of inserts, one of said pair of inserts being disposed on each lateral side of said core portion, wherein
said first and second tanks including the sheet metal members are made of aluminum type metallic material being lightweight and having low strength, said inserts are made of metallic material having a higher fusing point and higher strength than said aluminum type metallic material, and respective end portions of said inserts are fixed to said first tank and second tank; and
the end portion of at least one of said inserts is inserted into and fixed externally by the U-shaped portion of one of said sheet metal members of said first tank and said second tank such that a gap is provided along the axial direction of the tubes between an inside surface of the U-shaped portion and the end portion of said insert which compensates for a difference in thermal expansion between the sheet metal member and the insert.

2. The heat exchanger according to claim 1, wherein said aluminum type metallic material forming said core portion, said first tank and said second tank are aluminum composition metal, said inserts being made of one of iron and stainless steel.

3. The heat exchanger according to claim 2, wherein a thickness of said inserts is about 60% of a thickness of an aluminum insert having comparable strength.

4. The heat exchanger according to claim 1, wherein said fin is a corrugated fin and an aluminum brazing foil is fastened between a corrugated fin arranged at an outermost portion of said core portion and said insert during brazing.

5. The heat exchanger according to claim 1, wherein said inserts are plated with an aluminum-silicon type plating on a surface of an iron or a stainless steel core material of said inserts.

6. The heat exchanger according to claim 1, wherein at least one of said inserts includes a flange extending in a direction away from said core.

7. The heat exchanger according to claim 1, wherein the inserts are configured to allow the core portion to be brazed without a jig.

8. The heat exchanger according to claim 1, wherein the inserts are adapted to be slidably disposed relative to the sheet metal members while the core portion is being brazed and to be rigidly fixed to the sheet metal members after the core portion is brazed.

9. The heat exchange according to claim 1, wherein the fins are corrugated.

10. A method of manufacturing a heat exchanger, said method comprising the steps of:

alternately laminating tubes and fins to form a core;

disposing sheet metals on opposite ends of said core at which said tubes open, said sheet metals having U-shaped portions at ends thereof;

disposing inserts at opposing outermost sides of said core so that said inserts are held by said U-shaped portions of said sheet metals while leaving a clearance along the axial direction of the tubes between an inside surface of the U-shaped portion and an end portion of said insert;

brazing said core; and cooling said core such that the clearance is left after the cooling, so that, due to said clearance, said U-shaped portions do not collide with said ends of said inserts and deform.

11. The method of claim 10, further comprising the steps of:

temporarily fixing said inserts to said first tank and said second tank with a small force;

allowing said inserts and said first tank and second tank become free during said brazing step; and allowing said inserts to become tightly fixed to said first tank and second tank after the cooling.

12. The method of claim 10 wherein said brazing step includes a step allowing said inserts to slide within said U-shaped portions.

13. A heat exchanger produced by the steps of:

alternately laminating tubes and fins to form a core;

disposing sheet metals on opposite ends of said core at which said tubes open, said sheet metals having U-shaped portions at ends thereof; and disposing inserts at opposing outermost sides of said core so that said inserts are held by said U-shaped portions of said sheet metals while leaving a clearance along the axial direction of the tubes between an inside surface of the U-shared portion and an end portion of said insert;

brazing said core; and cooling said core such that the clearance is left after the cooling, so that, due to said clearance, said U-shaped portions do not collide with said ends of said inserts and deform.

14. The heat exchanger of claim 13, further produced by the steps of:

temporarily fixing said inserts to said first tank and said second tank with a small force;

allowing said inserts and said first tank and second tank become free during said brazing step; and allowing said inserts to become tightly fixed to said first tank and second tank after the cooling.

15. The heat exchanger of claim 13 wherein said brazing step includes a step of allowing said inserts to slide within said U-shaped portions.

* * * * *